(12) United States Patent
Naidoo et al.

(10) Patent No.: US 9,114,504 B2
(45) Date of Patent: Aug. 25, 2015

(54) METHOD OF MAKING POLYCRYSTALLINE DIAMOND MATERIAL

(75) Inventors: Kaveshini Naidoo, Springs (ZA); Geoffrey John Davies, Springs (ZA); Johannes Lodewikus Myburgh, Springs (ZA)

(73) Assignee: Element Six Abrasives S.A., Luxembourg (LU)

( * ) Notice: Subject to any disclaimer, the term of this patent is extended or adjusted under 35 U.S.C. 154(b) by 0 days.

(21) Appl. No.: 13/817,441

(22) PCT Filed: Aug. 26, 2011

(86) PCT No.: PCT/EP2011/064705
§ 371 (c)(1),
(2), (4) Date: May 3, 2013

(87) PCT Pub. No.: WO2012/025613
PCT Pub. Date: Mar. 1, 2012

(65) Prior Publication Data
US 2013/0291443 A1    Nov. 7, 2013

Related U.S. Application Data

(60) Provisional application No. 61/377,617, filed on Aug. 27, 2010.

(30) Foreign Application Priority Data

Aug. 27, 2010   (GB) .................................. 1014283.4

(51) Int. Cl.
*B24D 3/00*    (2006.01)
*B24D 3/02*    (2006.01)
(Continued)

(52) U.S. Cl.
CPC . *B24D 3/10* (2013.01); *B01J 3/062* (2013.01); *B82Y 30/00* (2013.01); *C01B 31/065* (2013.01);
(Continued)

(58) Field of Classification Search
USPC .................................... 51/307, 293, 308, 309
See application file for complete search history.

(56) References Cited

U.S. PATENT DOCUMENTS

3,745,623 A    7/1973   Wentorf, Jr. et al.
4,224,380 A    9/1980   Bovenkerk et al.
(Continued)

FOREIGN PATENT DOCUMENTS

EP    2 100 863 A1    9/2009
GB    1 240 526        7/1971
(Continued)

OTHER PUBLICATIONS

Westraadt et al., "Thermally Stable Polycrystalline Diamond Sintered with Calcium Carbonate", Diamond and Related Materials Elsevier Science Publishers, Amsterdam, vol. 16, No. 11, Oct. 18, 2007.
(Continued)

*Primary Examiner* — James McDonough
(74) *Attorney, Agent, or Firm* — Bryan Cave LLP

(57) ABSTRACT

A method for making polycrystalline diamond material comprises providing a plurality of diamond particles or grains, coating the diamond particles or grains with a binder material comprising a non-metallic catalyst material for diamond, consolidating the coated diamond particles or grains to form a green body, and subjecting the green body to a temperature and pressure at which diamond is thermodynamically stable, sintering and forming polycrystalline diamond material.

10 Claims, 3 Drawing Sheets

(51) Int. Cl.
    B24D 11/00     (2006.01)
    B24D 18/00     (2006.01)
    C09K 3/14      (2006.01)
    C09C 1/68      (2006.01)
    B24D 3/06      (2006.01)
    B01J 3/06      (2006.01)
    B82Y 30/00     (2011.01)
    C01B 31/06     (2006.01)
    C04B 35/52     (2006.01)
    C04B 35/628    (2006.01)
    C04B 35/645    (2006.01)

(52) U.S. Cl.
    CPC ............ *C04B 35/52* (2013.01); *C04B 35/6281*
        (2013.01); *C04B 35/62805* (2013.01); *C04B*
        *35/62886* (2013.01); *C04B 35/62889* (2013.01);
        *C04B 35/62897* (2013.01); *C04B 35/645*
        (2013.01); *B01J 2203/062* (2013.01); *B01J*
        *2203/0655* (2013.01); *B01J 2203/0685*
        (2013.01); *C04B 2235/3201* (2013.01); *C04B*
        *2235/3206* (2013.01); *C04B 2235/3208*
        (2013.01); *C04B 2235/3213* (2013.01); *C04B*
        *2235/3215* (2013.01); *C04B 2235/427*
        (2013.01); *C04B 2235/44* (2013.01); *C04B*
        *2235/442* (2013.01); *C04B 2235/5436*
        (2013.01); *C04B 2235/5454* (2013.01); *C04B*
        *2235/604* (2013.01); *C04B 2235/656* (2013.01);
        *C04B 2235/6567* (2013.01); *C04B 2235/77*
        (2013.01); *C04B 2235/96* (2013.01)

(56) References Cited

U.S. PATENT DOCUMENTS

| | | | |
|---|---|---|---|
| 4,288,248 A | | 9/1981 | Bovenkerk et al. |
| 4,572,722 A | | 2/1986 | Dyer |
| 4,636,253 A | | 1/1987 | Nakai et al. |
| 5,106,392 A | * | 4/1992 | Slutz et al. .................. 51/295 |
| 7,635,035 B1 | * | 12/2009 | Bertagnolli et al. .......... 175/434 |
| 2007/0169419 A1 | * | 7/2007 | Davis et al. .................. 51/293 |
| 2009/0263308 A1 | * | 10/2009 | Hall et al. .................... 423/446 |
| 2010/0242375 A1 | * | 9/2010 | Hall et al. .................... 51/307 |

FOREIGN PATENT DOCUMENTS

| | | |
|---|---|---|
| GB | 1 497 554 | 1/1978 |
| GB | 2 353 810 A | 3/2001 |
| GB | 2 435 061 A | 8/2007 |
| JP | 6009271 | 1/1994 |
| JP | 07053263 A | 2/1995 |
| JP | 4114966 | 5/1998 |
| JP | 2795738 B2 | 9/1998 |
| JP | 2002187775 | 7/2002 |
| JP | 2003226578 | 12/2003 |
| SU | 549935 A1 | 7/1983 |
| WO | 2007144733 A2 | 12/2007 |
| WO | 2011031912 A2 | 3/2011 |

OTHER PUBLICATIONS

International Search Report for PCT/EP2011/064705 dated Feb. 16, 2012.
Search Report for GB1014283.4 dated Nov. 16, 2010.
Search Report for GB1114732.9 dated Dec. 22, 2011.
Akaishi, M., et al., "Synthesis of Polycrystalline Diamond Compact with Magnesium Carbonate and its Physical Properties", Diamond and Related Materials, 5, 2-7, 1996.
Akaishi, M., et al., "Physical and Chemical Properties of the Heat Resistant Diamond Compacts from Diamond-Magnesium Carbonate System", Materials Science and Engineering, A209, 54-59, 1996.
Akaishi, M., et al., "Synthesis of Sintered Diamond with Calcium Carbonate and its Physical Properties", Journal of Hard Materials 3,(2), 75-82, 1992.

* cited by examiner

METHOD OF MAKING POLYCRYSTALLINE DIAMOND MATERIAL

FIELD

This disclosure relates to a method of making polycrystalline diamond (PCD) material, and to PCD material so made.

BACKGROUND

Cutter inserts for machine and other tools may comprise a layer of polycrystalline diamond (PCD) bonded to a cemented carbide substrate. PCD is an example of a superhard material, also called superabrasive material, which has a hardness value substantially greater than that of cemented tungsten carbide.

Components comprising PCD are used in a wide variety of tools for cutting, machining, drilling or degrading hard or abrasive materials such as rock, metal, ceramics, composites and wood-containing materials. PCD comprises a mass of substantially inter-grown diamond grains forming a skeletal mass, which defines interstices between the diamond grains. PCD material comprises at least about 80 volume % of diamond and may be made by subjecting an aggregated mass of diamond grains to an ultra-high pressure of greater than about 5 GPa and temperature of at least about 1,200 degrees centigrade in the presence of a sintering aid, also referred to as a catalyst or solvent/catalyst material for diamond. Catalyst material for diamond is understood to be material that is capable of promoting direct inter-growth of diamond grains at a pressure and temperature condition at which diamond is thermodynamically more stable than graphite. Some catalyst materials for diamond may promote the conversion of diamond to graphite at ambient pressure, particularly at elevated temperatures. Examples of catalyst materials for diamond are cobalt, iron, nickel and certain alloys including any of these. PCD may be formed on a cobalt-cemented tungsten carbide substrate, which may provide a source of cobalt catalyst material for the PCD. The interstices within PCD material may at least partly be filled with the catalyst material.

A well-known problem experienced with this type of PCD material, however, is that the residual presence of the catalyst material for diamond, in particular a metallic catalyst material for diamond, for example Co, Ni or Fe, in the interstices may have a detrimental effect on the performance of the PCD material at high temperatures. During application, the PCD material may heat up and degrade thermally, largely due to the presence of the metallic catalyst material that may catalyse graphitisation of the diamond and may also cause stresses in the PCD material due to the large difference in thermal expansion between the metallic catalyst material and the diamond microstructure.

One approach to addressing this problem is to remove, typically by leaching, the catalyst material, also referred to as a catalyst/solvent in the art, from the PCD material.

U.S. Pat. No. 3,745,623 and U.S. Pat. No. 4,636,253 teach the use of heated acid mixtures in the leaching process in which mixtures of HF, HCl, and $HNO_3$ and $HNO_3$ and HF, respectively, are used.

U.S. Pat. No. 4,288,248 and U.S. Pat. No. 4,224,380 describe removal of the catalyst/solvent by leaching the PCD tables in a hot medium comprising $HNO_3$—HF (nitric acid and hydrofluoric acid), alone or in combination with a second hot medium comprising HCl—$HNO_3$ (hydrochloric acid and nitric acid).

US 2007/0169419 describes a method of leaching a portion or all of the catalyst/solvent from a PCD table by shielding the portion of the PCD table not to be leached and immersing the shielded PCD table in corrosive solution to dissolve the catalyst/solvent in water and aqua regia. The leaching process is accelerated by the use of sonic energy, which agitates the interface between the PCD table and the corrosive solution to accelerate the dissolution rate of the catalyst/solvent.

U.S. Pat. No. 4,572,722 discloses a leaching process that is accelerated by forming a hole in the PCD table by laser cutting or spark emission prior to or during the leaching process. The PCD table is then leached by using conventional acid leaching techniques, electrolytic leaching and liquid zinc extraction.

An alternative approach to addressing the problem is to use a non-metallic catalyst material for diamond that produces a more thermally stable PCD material.

JP2795738 (B2) describes sintering a mixture of diamond powder and metal carbonates at pressures of 6-12 GPa and temperatures of 1700-2500° C. to give sintered polycrystalline material consisting of 0.1-15 vol % non-metallic binder in a sintered diamond layer.

JP4114966 describes the use of carbon powder added as a sintering aid to diamond powder and an alkali earth carbonate, in order to improve the sinterability of the non-metallic system.

JP2003226578 also addresses the problem of poor sinterability, which describes the use of oxalic acid dihydrate as a sintering aid in a carbonate-based non-metallic solvent/catalyst system.

JP2002187775 describes the addition of other organic compounds to achieve a sintered carbonate-based non-metallic PCD, and similarly the addition of metal carbides is described in JP6009271.

SUMMARY

Viewed from a first aspect there is provided a method for making polycrystalline diamond material, the method comprising providing a plurality of diamond particles or grains, coating the diamond particles or grains with a binder material comprising a non-metallic catalyst material for diamond, consolidating the coated diamond particles or grains to form a green body, and subjecting the green body to a temperature and pressure at which diamond is thermodynamically stable, sintering and forming polycrystalline diamond material.

In some embodiments, the diamond particles or grains are suspended in a liquid medium, the non-metallic catalyst material for diamond precipitating in situ onto the surfaces of respective diamond particles or grains in the liquid medium in order to coat the diamond particles or grains.

In some embodiments, the non-metallic catalyst material for diamond is a precipitated salt comprising the reaction product of a solution of a first salt of an alkali or alkali earth metal and the solution of a second salt of an anion capable of forming an insoluble salt with the alkali earth or alkali earth metal of the first salt.

In some embodiments, the first and second salt containing solutions are introduced simultaneously into the diamond suspension, thereby coating the diamond particles or grains upon precipitation of the non-metallic catalyst material for diamond.

In some embodiments, the diamond particles or grains prior to coating have an average particle or grain size of from about 10 nanometers to about 50 microns.

In some embodiments, a multimodal mixture of diamond particles or grains of varying average particle or grain size are provided.

In some embodiments, the diamond content of the polycrystalline diamond material is at least about 80 percent, at least about 88 percent, at least about 90 percent, at least about 92 percent or even at least about 96 percent of the volume of the polycrystalline diamond material. In one embodiment, the diamond content of the polycrystalline diamond material is at most about 98 percent of the volume of the polycrystalline diamond material.

In some embodiments, the content of the non-metallic catalyst material is at most about 10 volume percent, at most about 8 volume percent, or even at most about 4 volume percent of the PCD material.

In one embodiment, the method includes subjecting the green body in the presence of the non-metallic catalyst material for diamond to a pressure and temperature at which diamond is more thermodynamically stable than graphite. In one embodiment, the pressure is at least about 6.8 GPa and the temperature is at least about 2000 degrees centigrade.

Viewed from a further aspect there is provided a mass of diamond particles or grains coated in a non-metallic catalyst material for diamond.

In some embodiments, the non-metallic catalyst material for diamond is selected from the group of alkali or alkali earth metals of carbonates.

In some embodiments, the non-metallic catalyst material for diamond is selected from the group consisting of calcium carbonate, magnesium carbonate, barium carbonate, strontium carbonate, sodium carbonate, and mixtures thereof.

In one embodiment, the non-metallic catalyst material for diamond is a combination of calcium carbonate and magnesium carbonate.

In some embodiments, the thickness of the coat on respective diamond particles or grains is from about 5 nanometers to about 5 microns.

In some embodiments, the respective coated diamond particles or grains comprise from about 1 to about 50% by volume, or from about 5 to about 15% by volume, of the non-metallic catalyst material for diamond.

In some embodiments, surface coverage of the respective diamond particles or grains is from about 5 to about 100%.

Viewed from another aspect there is provided a wear element comprising the polycrystalline diamond material formed according to the above methods.

BRIEF DESCRIPTION OF THE DRAWINGS

Non-limiting embodiments will now be described by way of example with reference to the accompanying drawings in which.

DETAILED DESCRIPTION OF EMBODIMENTS

Figure 1:
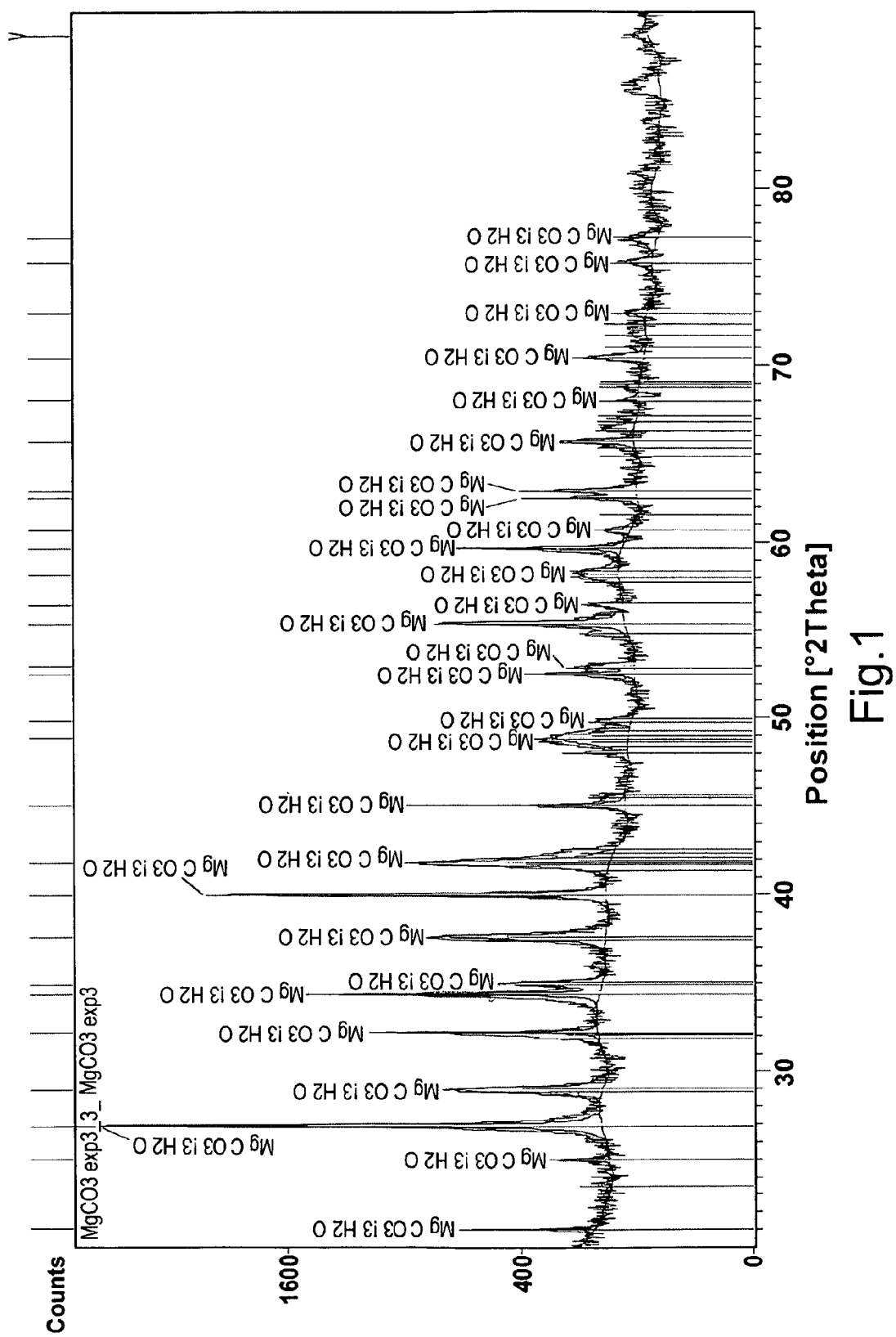
FIG. 1 is an XRD analysis of a sample of an embodiment of a polycrystalline diamond material.

As used herein, "polycrystalline diamond" (PCD) material comprises a mass of diamond grains, a substantial portion of which are directly inter-bonded with each other and in which the content of diamond is at least about 80 volume percent of the material. In one embodiment of PCD material, interstices between the diamond grains may be at least partly filled with a binder material comprising a non-metallic catalyst for diamond.

As used herein, "non-metallic catalyst material for diamond" is a material that is capable of being coated onto the surface of a diamond particle or grain, and is capable of catalysing intergrowth of polycrystalline diamond particles or grains under conditions of temperature and pressure at which diamond is more thermodynamically stable than graphite.

As used herein, "interstices" or "interstitial regions" are regions between the diamond grains of PCD material.

A multi-modal size distribution of a mass of grains is understood to mean that the grains have a size distribution with more than one peak, each peak corresponding to a respective "mode". Multimodal polycrystalline bodies are typically made by providing more than one source of a plurality of grains, each source comprising grains having a substantially different average size, and blending together the grains or particles from the sources. Measurement of the size distribution of the blended grains typically reveals distinct peaks corresponding to distinct modes. When the grains are sintered together to form the polycrystalline body, their size distribution is further altered as the grains are compacted against one another and fractured, resulting in the overall decrease in the sizes of the grains. Nevertheless, the multi-modality of the grains is usually still clearly evident from image analysis of the sintered article.

As used herein, a green body is an article that is intended to be sintered or which has been partially sintered, but which has not yet been fully sintered to form an end product. It may generally be self-supporting and may have the general form of the intended finished article.

As used herein, a superhard wear element is an element comprising a superhard material and is for use in a wear application, such as degrading, boring into, cutting or machining a workpiece or body comprising a hard or abrasive material.

In some embodiments, a method for making polycrystalline diamond material includes coating a plurality of diamond particles or grains with a binder material comprising a non-metallic catalyst material for diamond. The coated diamond particles or grains are consolidated into a green body, which green body is then subjected to a temperature and pressure at which diamond is more thermodynamically stable than graphite in order to sinter it and form polycrystalline diamond material.

In an embodiment, the non-metallic binder material is combined with the diamond particles or grains in a so I-gel process. Diamond powder is suspended in a liquid under vigorous stirring to form a diamond suspension. The liquid may be, for example, water although any appropriate liquid medium may be used. A first salt of the desired alkali or alkali earth metal is chosen such that it is soluble in a solvent, but forms an insoluble salt with a chosen anion in the diamond suspension. A second salt of the desired anion is chosen such that it is soluble in a solvent, but the anion forms an insoluble salt with the alkali or alkali earth metal of the first salt.

The two salt containing solutions are added concomitantly drop wise to the diamond suspension such that an insoluble precipitate consisting of the alkali or alkali earth metal of the first salt and the anion of the second salt forms on the surface of the respective diamond particles or grains.

The liquid containing the suspended diamond particles or grains is stirred during the drop wise addition. This stirring may be accomplished by a heater-stirrer and magnetic stirrer, or by an overhead stirrer, or by ultrasonication, or any other suitable method that is able effectively to disperse the diamond particles in the liquid.

The diamond powder with precipitated salt may be removed from suspension and dried at a temperature suitable for removing any residual suspension medium or solvents that may be present. The drying temperature is typically 50-100° C. The diamond with precipitated salt may be stationary during drying, or may be agitated, tossed or moved in a way that increases the efficiency or rate of drying.

Prior to precipitation, the diamond particles may have an average particle size ranging from 10 nanometers to 50 microns. They may have surface functional groups including hydroxyl, carbonyl, carboxylic, aldehydic, ketonic or any other surface functional groups containing one or more of oxygen, carbon, hydrogen, nitrogen and boron.

The precipitated salt that forms on the diamond particle surfaces may consist of round globules, flattened domes, elongated shapes such as whiskers or fibres, or flat or irregular shapes. The precipitated salt may cover the diamond particles in part or completely, provided the coats are thin enough to allow diamond intergrowth to take place under the chosen sintering conditions. The precipitated salt may consist of units with at least one dimension being of an average particle size ranging from 2 nanometers to 1 micron.

The precipitated salt may be chosen from the group of alkali or alkali earth metals of carbonates. Examples are calcium carbonate, magnesium carbonate, barium carbonate, strontium carbonate, sodium carbonate, or mixtures thereof. The precipitated salt may be a mixture of calcium carbonate and magnesium carbonate, which may be deposited simultaneously or sequentially. Other examples of non-metallic catalyst material for diamond, as will be appreciated by those persons skilled in the art, include sulphates, hydroxides, oxides, phosphates and silicates.

The diamond particles with precipitated salt are consolidated to form a green body in a suitable container and placed in a high pressure high temperature press. Pressure and heat are applied in order to sinter the diamond particles together, typically at pressures of 6.8-7.7 GPa or more and temperatures of 2000-2200° C. or more.

In the sintered compact, the diamond grains show intergrowth, and may have an average grain size ranging from 10 nanometers to 50 microns.

In the sintered compact, the non-metallic binder consists of grains of average particle size ranging from 2 nanometers to 5 microns.

EXAMPLES

Some embodiments are described in more detail with reference to the examples below, which are not intended to be limiting.

Example 1

100 g of diamond powder of average particle size 4 microns was weighed into a 5 liter beaker and 2 liters of deionised water was added, and stirred using a magnetic stirrer. An ultrasonic probe was inserted into the beaker and the water-diamond suspension was ultrasonicated for 15 minutes to ensure complete dispersion of the diamond powder. The probe was then removed, but stirring continued. A solution of 5.5 g of anhydrous magnesium chloride was made up in a 1 liter glass beaker in 200 ml deionised water and transferred to a dropping funnel. Another solution of 5.7 g of anhydrous ammonium carbonate was made up in a 1 liter glass beaker in 200 ml deionised water, and transferred to a separate dropping funnel. The dropping funnels were positioned above the glass beaker and the two solutions added drop wise to the suspended diamond over a period of about 45 minutes. The solution concentrations and amounts were calculated to give an approximate value of 5 vol % of magnesium carbonate in the final coated diamond powder. Stirring was continued for about 10 minutes. The diamond coated with magnesium carbonate precipitate was filtered off and washed with cold deionised water, and finally washed with ethanol and dried at 40° C. overnight in an oven. SEM analysis showed precipitates of magnesium carbonate on the surface of the diamond particles. The precipitates were typically flattened domes of approximately 30 to 300 nanometers diameter. XRD analysis confirmed that the precipitate was $MgCO_3 \cdot 3H_2O$, as shown in accompanying FIG. 1.

The dried diamond-magnesium carbonate powder was placed in a metal cup and placed in a high pressure high temperature press, and subjected to a pressure of approximately 7.7 GPa and a temperature of approximately 2100° C. for approximately 1 minute. The sintered PCD was recovered and polished, and examined by SEM. Some intergrowth of the diamond grains was observed.

Example 2

Figure 2:
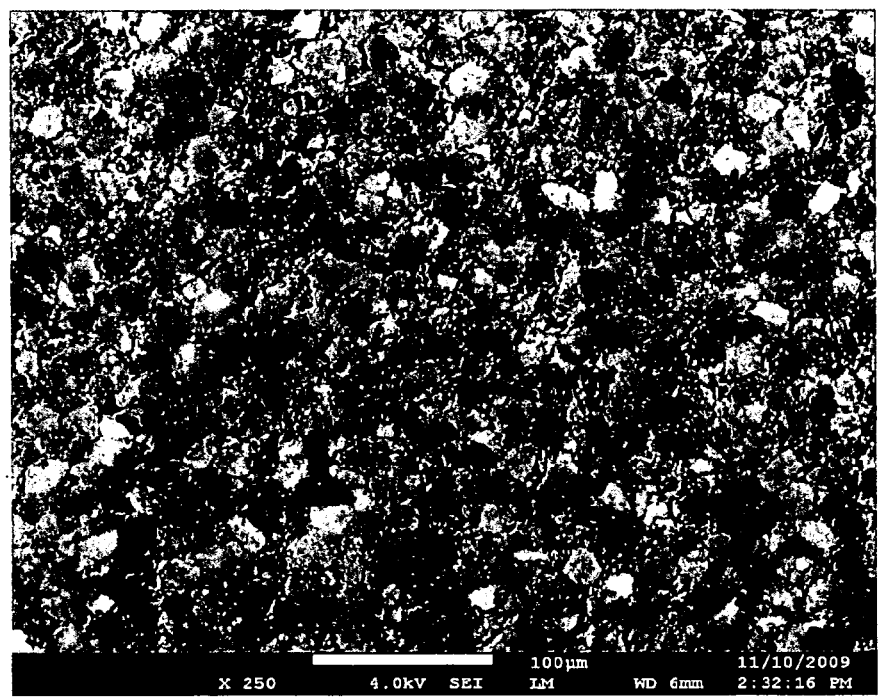
FIG. 2 is an SEM micrograph of a cross-section through an embodiment of a polycrystalline diamond material at 250× magnification.
Figure 3:
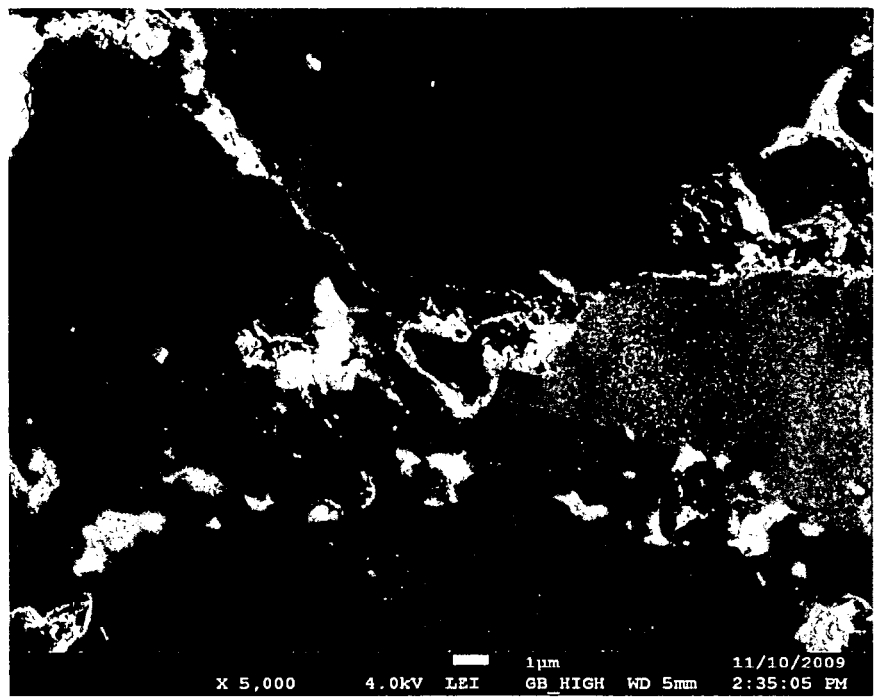
FIG. 3 is an SEM micrograph of a cross-section through an embodiment of a polycrystalline diamond material at 5,000× magnification.
Figure 4:
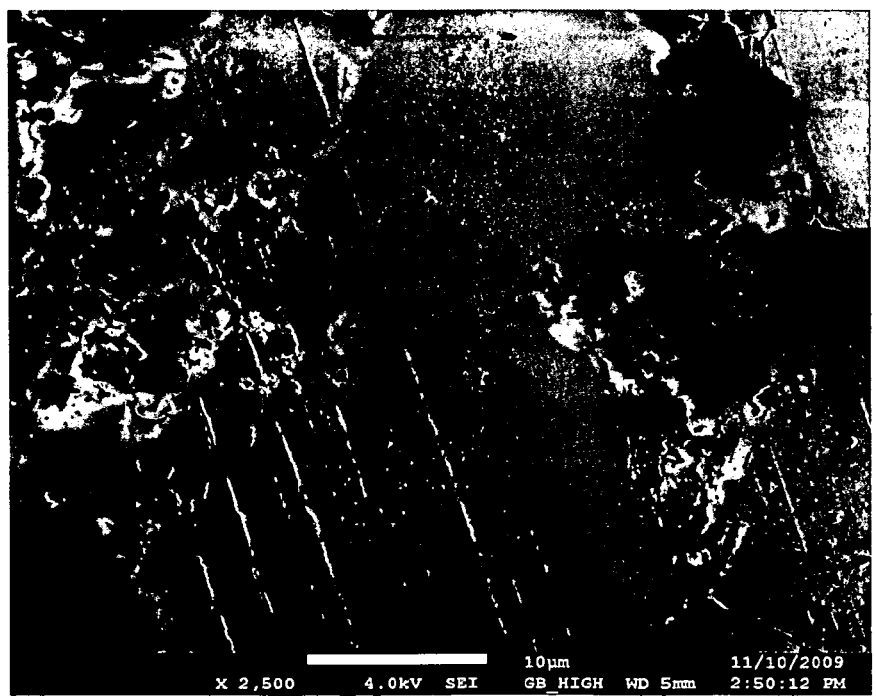
FIG. 4 is an SEM micrograph of a cross-section through an embodiment of a polycrystalline diamond material at 2,500× magnification.

The same procedure was followed as in Example 1, except that the sintering temperature was increased to approximately 2250° C. SEM analysis of a polished sample showed much more intergrowth than in Example 1, as shown in accompanying FIGS. 2 to 4.

Example 3

The same procedure was followed as in Example 1, except that the sintering temperature was increased to approximately 2200° C. SEM analysis of a polished sample showed much more intergrowth than in Example 1.

Example 4

The same procedure was followed as in Example 1, except that the sintering temperature was increased to approximately 2200° C. and the dwell time was increased to 3 minutes. SEM analysis of a polished sample showed much more intergrowth than in Example 1.

The properties of the four samples of Examples 1 to 4 were measured and are reported in Table 1.

TABLE 1

|  | Example 1: 7.7 GPa, 2100° C., 1 minute dwell | Example 2: 7.7 GPa, 2250° C., 1 minute dwell | Example 3: 7.7 GPa, 2200° C., 1 minute dwell | Example 4: 7.7 GPa, 2200° C., 3 minute dwell |
| --- | --- | --- | --- | --- |
| Density (g/cm$^3$) | 3.38 | 3.49 | 3.46 | 3.48 |
| Poisson's ratio | 0.089 | 0.087 | 0.109 | 0.090 |
| Young's modulus (GPa) | 389 | 878 | 844 | 922 |

Thermogravimetric analysis of the samples confirmed their improved thermal stability over PCD with a metallic binder. The onset of oxidation for PCD with a Co—WC binder was measured as being 750° C., whilst the onset of oxidation for PCD samples of the current invention, using a non-metallic binder, was at approximately 970° C.

Wear behaviour tests while drilling rock showed a 24-85% improvement in wear performance of the non-metallic PCD when compared with Co—WC based PCD.

The invention claimed is:

1. A method for making polycrystalline diamond material, the method comprising providing a plurality of diamond particles or grains, coating the diamond particles or grains with a binder material comprising a non-metallic catalyst material for diamond, consolidating the coated diamond particles or grains to form a green body, and subjecting the green body to a temperature and pressure at which diamond is thermodynamically stable, sintering and forming polycrystalline diamond material; wherein the diamond particles or grains are suspended in a liquid medium, the non-metallic catalyst material for diamond precipitating in situ onto the surfaces of respective diamond particles or grains in the liquid medium in order to coat the diamond particles or grains.

2. A method according to claim 1, wherein the non-metallic catalyst material for diamond is a precipitated salt comprising the reaction product of a solution of a first salt of an alkali or alkali earth metal and the solution of a second salt of an anion capable of forming an insoluble salt with the alkali earth or alkali earth metal of the first salt.

3. A method according to claim 2, wherein the step of suspending the diamond particles or grains in the liquid medium includes forming a diamond suspension in the liquid medium; and the step of coating the diamond grains or particles comprises introducing the first and second salt containing solutions simultaneously into the diamond suspension, thereby coating the diamond particles or grains upon precipitation of the non-metallic catalyst material for diamond.

4. A method according to claim 1, wherein the diamond particles or grains prior to coating have an average particle or grain size of from about 10 nanometers to about 50 microns.

5. A method according to claim 1, wherein the diamond content of the polycrystalline diamond material is at least about 80 percent and at most about 98 percent of the volume of the polycrystalline diamond material.

6. A method according to claim 1, wherein the non-metallic catalyst material for diamond is a precipitated salt selected from the group consisting of alkali or alkali earth metal carbonates.

7. A method according to claim 6, wherein the non-metallic catalyst material for diamond is selected from the group consisting of calcium carbonate, magnesium carbonate, barium carbonate, strontium carbonate, sodium carbonate, and mixtures thereof.

8. A method according to claim 1, wherein the polycrystalline diamond material comprises at most about 10 volume percent of the non-metallic catalyst material for diamond.

9. A method according to claim 1, wherein the method includes subjecting the green body in the presence of the non-metallic catalyst material for diamond to a pressure and temperature at which diamond is more thermodynamically stable than graphite.

10. A method according to claim 9, wherein the pressure is at least about 6.8 GPa and the temperature is at least about 2000 degrees centigrade.

* * * * *